(12) United States Patent
Jones et al.

(10) Patent No.: US 11,491,541 B2
(45) Date of Patent: Nov. 8, 2022

(54) HYBRID PROCESS FOR ENHANCED SURFACE HARDENING

(71) Applicant: Apollo Machine & Welding Ltd., Leduc (CA)

(72) Inventors: Dakota Z. Jones, Edmonton (CA); Gentry D. Wood, Edmonton (CA); Douglas J. Hamre, Sherwood Park (CA)

(73) Assignee: APOLLO MACHINE & WELDING LTD., Leduc (CA)

( * ) Notice: Subject to any disclaimer, the term of this patent is extended or adjusted under 35 U.S.C. 154(b) by 321 days.

(21) Appl. No.: 16/507,285

(22) Filed: Jul. 10, 2019

(65) Prior Publication Data

US 2020/0376559 A1  Dec. 3, 2020

(30) Foreign Application Priority Data

May 31, 2019 (CA) ..................................... 3044930

(51) Int. Cl.
*B22F 3/24* (2006.01)
*C23C 8/26* (2006.01)
(Continued)

(52) U.S. Cl.
CPC ................ *B22F 3/24* (2013.01); *B22F 10/20* (2021.01); *B33Y 10/00* (2014.12); *B33Y 40/00* (2014.12);
(Continued)

(58) Field of Classification Search
CPC ...... B22F 3/24; B22F 10/20; B22F 2003/248; B22F 10/60; B22F 10/25; B22F 2999/00; B22F 7/06; B22F 7/08; B22F 2003/241; C23C 8/26; C23C 8/68; C23C 8/70; C23C 8/48; C23C 8/50; C23C 8/30; C23C 8/32; C23C 8/34; C23C 8/36; C23C 8/38; C23C 8/20; C23C 8/22; C23C 8/24; C23C 8/02;
(Continued)

(56) References Cited

U.S. PATENT DOCUMENTS 2,437,249 A  3/1948 Floe
3,377,214 A  4/1968 Woodbrige et al.
(Continued)

FOREIGN PATENT DOCUMENTS

CN  104962856 A  10/2015
CN  106276478 A  1/2017
(Continued)

OTHER PUBLICATIONS

Yan M.F. et al., "Laser quenching of plasma nitrided 30CrMnSiA steel", Materials and Design 58 (2014); p. 154-160.
(Continued)

*Primary Examiner* — Rebecca Janssen
(74) *Attorney, Agent, or Firm* — Finch & Maloney PLLC

(57) ABSTRACT

A hybrid method of surface hardening metallic components using a combination of chemical modification achieved through additive manufacturing and/or diffusion-based processing with transformation-based processing using a high energy density heat source. The hybrid process results in increased surface hardness and/or increased average case hardness and/or increased case depth compared to either treatment individually.

13 Claims, 14 Drawing Sheets

(51) Int. Cl.
  *C21D 1/06* (2006.01)
  *B33Y 10/00* (2015.01)
  *B33Y 40/00* (2020.01)
  *B22F 10/20* (2021.01)

(52) U.S. Cl.
  CPC .............. *C21D 1/06* (2013.01); *C23C 8/26* (2013.01); *B22F 2003/248* (2013.01)

(58) Field of Classification Search
  CPC ........... C23C 8/80; B33Y 10/00; B33Y 40/00; B33Y 40/20; B33Y 80/00; C21D 1/06; Y02P 10/25
  See application file for complete search history.

(56) References Cited

U.S. PATENT DOCUMENTS

| | | |
|---|---|---|
| 3,884,730 A | 5/1975 | Hehl |
| 4,300,474 A | 11/1981 | Livsey |
| 4,304,978 A | 12/1981 | Saunders |
| 5,413,641 A | 5/1995 | Coulon |
| 2012/0118434 A1 | 5/2012 | Konishi et al. |
| 2014/0065003 A1* | 3/2014 | Narasimhan ............ C22C 38/00 419/13 |
| 2015/0041025 A1 | 2/2015 | Wescott et al. |
| 2015/0147545 A1 | 5/2015 | Roland et al. |
| 2018/0119239 A1* | 5/2018 | Tuffile ................... C22C 38/48 |

FOREIGN PATENT DOCUMENTS

| | | |
|---|---|---|
| CN | 106367712 A | 2/2017 |
| EP | 3054026 A1 | 8/2016 |
| KR | 1020130010257 | 1/2013 |
| WO | 2008043062 A1 | 4/2008 |
| WO | 2012126138 A1 | 9/2012 |

OTHER PUBLICATIONS

Kulka M. et al., "Laser heat treatment of gas-nitrided layer produced on 42CrMo4 steel", Materials Engineering 5 (207), pp. 301-305.

Colombini et al., "Laser Quenching of Ionic Nitrided Steel: Effect of Process Parameters on Microstructure and Optimization; Metallurginal and MAterials Transactions", Nov. 2014.

* cited by examiner

HYBRID PROCESS FOR ENHANCED SURFACE HARDENING

FIELD

This relates to a method of surface hardening metallic components, namely, a method that uses a combination of chemistry modification and transformation-based processing to harden the surface.

BACKGROUND

A variety of surface hardening techniques exist to control the surface properties of engineered components for the purpose of improving longevity and/or performance of the component. Surface hardening may improve wear-resistance, corrosion-resistance, erosion-resistance, sliding friction performance, fatigue strength, mechanical indentation-resistance or a combination thereof. It is important that surface hardening only target the surface layer and not the bulk material, so that the mechanical properties of the core are maintained. This type of targeted treatment is important for many engineered components, as the metallurgical processing required to achieve the desired properties of the hardened case has the potential to create undesirable properties in the core if the entire cross-section is exposed to the same processing conditions. The thickness of the modified layer, whether chemical, microstructural or a combination thereof, termed case depth, as well as its hardness are important variables used to quantify the quality of the surface layer. In general, deeper cases and harder surface layers improve the performance of engineered parts through a variety of well-known beneficial effects. Some effects may include: higher surface hardness, higher average case hardness and deeper case depths increase abrasive wear-resistance of steels; higher surface hardness and deeper case depths lower the coefficient of friction; and deeper case depths may improve the fatigue life of components exposed to cyclical or Hertzian stresses. As wear occurs, deeper cases and higher average case hardness are ideal for maintaining surface hardness over the useful life of the engineered component, as once the softer bulk material is exposed, wear rates increase significantly. The relationship between hardness and wear resistance of pure metals and alloys is well established in literature, as exemplified in ASM Handbook, Volume 18, Friction, Lubrication and Wear Technology, "Abrasive Wear". The depth and hardness of the case is dependent on the processing method used to create it. Control over the depth and hardness of the case influences the performance of the engineered component. Excessively deep cases have the potential to affect the bulk properties of the component, which could lead to premature failure of the component.

Conventional techniques for surface hardening generally fall into two broad categories: those that change the chemistry of the surface layer via diffusion or additive manufacturing, and those that transform the microstructure through induced heating and cooling profiles referred to as thermal cycles. Induced thermal cycles may affect the following mechanisms; solid solution strengthening, grain boundary strengthening, strain ageing, precipitation hardening, lattice hardening, dislocation strengthening, phase strengthening, preferred orientation strengthening, or any combination thereof. Transformative processes may be performed at elevated temperature for an appropriate period of time to result in transformation of the entire cross-section, but in the case of surface hardening, these methods are not applicable since they affect the core as well as the surface. Only the transformative processes that introduce a sufficient amount of thermal energy with appropriate control to induce a microstructural change only near the surface, over a suitably short period of time to prevent a microstructural change in the bulk, are relevant to surface hardening. High energy density heat sources unlock the possibility of applying sufficiently high heat to induce such transformations at the surface of metallic components whilst minimizing the microstructural effects on the bulk of material. High energy density heat sources inherently have a high degree of controllability over the localized heat flux, which may be used to manage the heating rate, peak temperature achieved, and resulting cooling rate of the treated surface once the heat source is removed. This high degree of heat source control may be used by those skilled in the art of high energy density source processing to tailor case depths for engineered components.

The techniques that modify the surface chemistry include additive manufacturing and diffusion-based processing. Additive manufacturing is the deposition of material, which may or may not be dissimilar, at the surface of a component, which may behave differently than the bulk of the component when combined with diffusion-based and/or transformation-based surface hardening processes. Diffusion-based processes have many variations, but follow the same general principles to achieve the desired surface properties; the surface is hardened through the surface adsorption and subsequent diffusion of interstitial elements into the material at elevated temperatures to form compressive stress fields due to mechanisms such as solid solution strengthening and precipitation strengthening. Some processes which are well known in the prior art may include the broad categories of boronizing, carburizing and nitriding, which are themselves divided into other variations such as low temperature carburizing, low temperature nitriding, carbonitriding, nitrocarburizing, oxynitriding, ion nitriding, and salt-bath nitriding. Both adsorption and diffusion are thermally activated mechanisms dependent on time, meaning that an increase in temperature is necessary to facilitate an increase in the reaction rate. Increased reaction rates allow for larger case depths in the same period of time. Since the process is controlled by diffusion, the hardness profile into the surface is a decaying function with diminishing returns over time as evidenced by the profile of the curve 101 given in prior art FIG. 1. This profile also leads to a substantial decrease in wear-resistance as the surface is worn away and softer material is exposed. Diffusion rates increase with increased temperatures, but increased temperatures also increase the potential for distortion resulting from the process, and the likelihood of inducing detrimental microstructural transformation in the core. Component distortion may be unacceptable for tight dimensional tolerances on some engineered components, which may provide a limit to increasing temperature to decrease processing times. While time may be increased to create deeper cases, the decaying aspect of diffusion discourages longer times as the economic benefit decreases at a corresponding rate. This is demonstrated in the generalized relationship for diffusion provided in the ASM Handbook Volume 4A where Case Depth=$K\sqrt{Time}$, where K is a constant that depends on the process, process parameters relevant to the specific process and the material being treated. The practical significance is that treatment times for even relatively shallow case depths 100 may be on the order of tens of hours for industrial applications. Oftentimes, the economically feasible case depths achieved with diffusion-based processes are insufficient or not ideal for the application. Surface hardness 102 in the example shown in prior art FIG. 1 demonstrates the relatively high hardness at the surface of a diffusion-based process with respect to the unaffected core hardness 103. Diffusion-based processes are influenced by the chemistry of the material being treated as well as the microstructural condition, which affect the rates of adsorption, diffusion, and precipitation during processing. The rates at which the process occurs in turn affect the economically achievable case depth, surface properties, and hardness profile for engineered components. The chemistry change may be somewhat controlled by varying the flux of species at the surface, which is controlled by process parameters such as temperature, gas pressure, gas composition, electrical potential, etc. While a high flux will enhance diffusion, there is potential for the formation of phases at the surface with poor tribological properties, despite their high hardness. A low flux may be used to control the surface concentration and subsequent properties such as hardness, but a low flux will result in much less diffusion in the same time span. A multiple stage process is used in many processes to achieve the desired case depth in as short a time as possible while controlling the concentration at the surface by changing the flux at the surface throughout the process. This is often done in two stages: a first stage with high flux at the surface and a second stage with lower flux, although any number of stages may be used to achieve the desired interstitial concentration profile as a function of depth from the surface. Variance in initial material chemistry and processing history; interstitial element and diffusion method; case depth and hardness requirements; and component geometry lead to a wide range of input parameters which must be tailored to a specific application. Examples of diffusion methods include Boost-Diffuse carburization and the Floe Process for gas nitriding. Since not all materials can be hardened in a desirable way with diffusion-based processes, designers are constrained in their material selection. These concerns may be alleviated by using additive manufacturing.

Additive manufacturing refers to a variety of techniques which can deposit material with chemistry that may be similar or dissimilar to the substrate. These surfaces may be iteratively fused to a metallic substrate layer-by-layer in order to create complex geometries and features and/or surface coatings. Many additive manufacturing processes utilize conventional welding processes to deposit similar or dissimilar metals by creating a molten pool and mixing with filler material either in the form of wire or powder. U.S. Pat. No. 4,300,474 (Livsey), entitled "Apparatus for Application of Metallic Coatings to Metallic Substrates" is an example of high energy density heat source surface modification technology utilized in repetitive sequence to accomplish additive manufacturing. US pregrant pub. no. 2015/0041025 (Wescott et al.), entitled "Additive Layer Manufacturing", is another example of an additive manufacturing process.

The balance between surface properties and bulk properties of an engineered component are dictated by the design and function of that component. As a result, many applications require dramatically different properties at the surface compared with the bulk of the component, or the core to ensure successful performance of a given component. Techniques which rely on surface transformation alone must be capable of hardening the surface to a sufficient targeted depth, whilst also not hardening so deep as to affect the core. Such surface transformations are accomplished by the application of sufficient heat and the resulting thermal cycle to induce microstructural changes in an engineered component dependent on the alloy chemistry and geometry. Some of these processes are difficult to control, as they treat relatively large areas simultaneously and indiscriminately making it impossible to target specific features. Insufficient control of the process may lead to defects at stress concentrations and complex geometries such as edges, corners and holes. Heat sources applied to large areas instantaneously can also build up an excessive amount of heat due to the large area heated, which may result in distortion or negative effects on the microstructure of the core. Increased heat input during heating may decrease the resulting near surface cooling rate, which in general results lower surface hardness and/or deeper case depths. To compensate, external cooling systems may be used. External cooling systems can introduce defects, increase the variability in cooling rate consistency, prevent the ability to affect cooling rate locally with respect to geometric features, and cannot achieve the very fast cooling rates of high energy density heat sources. Heating rate, cooling rate, peak temperature, and time at peak temperature are the fundamental parameters that determine, surface hardness, average case hardness and case depth of a given material during a heat treatment. Faster cooling increases hardness by limiting diffusion for many engineering materials and by preventing the formation of softer, undesirable microstructural constituents. The peak temperature may be reduced to mitigate some of the aforementioned problems, however peak temperature reduction results in shallower case depths and potentially lower hardness in the case. Methods that utilize high energy density heat sources are preferable, as they only treat localized areas of a component, resulting in minimal distortion, and less total energy transfer to the component while attaining the localized heating required to induce microstructural transformation on cooling. High energy density heat sources induce cooling from the temperature gradient between the treated surface and bulk material, eliminating the need for an external cooling system and enabling faster cooling rates from high temperatures through rapid internal heat conduction. With high energy density heat sources, specific features may be targeted for hardening independent of the rest of the component and localized control of case depth. Control of case depth at various locations along a component may improve the performance of engineered components by controlling the local stress fields in specific areas. The example shown in FIG. 3 of laser hardening of alloy steel shows the ability to precisely control the case depth since the hardness profile of the case is uniform 104, and the transition between the hardened case and the bulk hardness occurs over a relatively short distance 107 compared to the gradual transition associated with diffusion-based processes 101. Transformation-based processes utilizing a high energy density heat source are limited by an increased risk of incipient surface melting as a consequence of the concentrated heat of the process. If surface melting occurs, undesirable effects related to solidification can follow, including, but not limited to: a decrease in hardness in the melted or re-solidified area, solidification defects, and changes in surface geometry that require an additional machining step. Input parameters for transformation-based processes utilizing high energy density sources may vary widely, as they are influenced by many factors such as: surface chemistry, heat treatment, microstructural condition, and past processing of the material; size of the area exposed to the heat source; required case depth and hardness; component geometry; and absorptivity. Input parameters must therefore be selected with careful consideration of energy flux to ensure successful treatment of a given component.

U.S. Pat. No. 4,304,978 (Saunders), entitled "Heat Treatment Using a Laser", is an example of a transformation-based heat treatment utilizing a high energy density heat source which cannot achieve the same high surface hardness as the hybrid process for a given material due to the inability of that process to modify the surface chemistry.

Deep case depths and/or high surface hardness have been demonstrated to improve performance of engineered components and are capable of improving component life. U.S. Pat. No. 3,884,730 (Hehl), entitled "Machine Element of Surface-Hardened Steel Having an Improved Resistance Against Wear, Heat, and Mechanical Stress" is an example of transformation-based processes using heat sources to induce surface hardening for improved performance of engineered components and illustrates long-standing efforts to increase surface hardness of metallic components.

SUMMARY

According to an aspect, there is provided a method of surface hardening metallic materials using a combination of near surface chemistry modification and transformation-based methods which utilize high energy density heat sources to develop an improved hardness profile as a function of depth from the surface, characterized by case depth, surface hardness and average case hardness in comparison with individual treatments. Chemistry modification may be achieved using diffusion-based methods, additive manufacturing methods, or combinations thereof. Diffusion-based methods alter the surface chemistry by insertion of interstitial elements into an established material chemistry. Additive manufacturing may tailor the surface chemistry through deposition of similar or dissimilar material chemistry at the surface compared with the base material.

According to another aspect, diffusion-based processing may be used to develop an appropriate interstitial concentration distribution and microstructural condition of the near surface region of a component to elicit an increase in the hardness of the hybrid region compared to the case hardness typically achieved with high energy density transformation-based processing alone. This may be achieved using diffusion based processing that uses multiple stages, including an extended diffusion stage.

According to another aspect, the chemical modification must be sufficiently controlled such that hybrid processing using high energy density transformation-based processing does not result in melting or softening of the surface below the hardness of diffusion based processing alone, whilst achieving a relatively deep case depth.

Treatment of the surface using additive manufacturing to modify the surface chemistry locally may be used in combination with diffusion-based processing to increase surface hardness and the hardness as a function of case depth. High energy density transformation-based surface hardening may be performed in combination with additive manufacturing and/or diffusion-based processing to enhance the achievable depth of hardening further. High energy density transformation-based hardening may also be performed following diffusion-based processing.

According to another aspect, a combination of chemical modification steps may be conducted to prepare the component for subsequent high energy density processing. Combinations of chemical modification steps may require intermediate heat treatment steps to maintain core properties and/or optimize the properties of the additively manufactured material.

According to another aspect, the targeted area is heated at a sufficiently rapid rate to reach the targeted peak temperature without significant conduction of heat beyond the targeted area to ensure that the resultant cooling rate is sufficiently rapid so as to create the measurable, significant hardening of the hybrid process and to prevent detrimental effects to the properties of the bulk of material.

According to another aspect, the energy density of the heat source at the component surface provides sufficient energy to facilitate microstructural changes in the material, whilst being low enough to ensure that the effects of melting do not adversely affect the finished component. The allowable energy density is dependent on several factors, examples of which may include: absorptivity of the incident surface, material chemistry, surface chemistry, presence of an oxide layer, surface finish, type of energy source, part geometry, and material thickness.

According to an aspect, the high energy density heat source may not be dependent on intensity profile. Some examples may include: point heat sources, Gaussian-heat sources, and "top hat" heat sources. High energy density heat sources are known and well defined in terms of power density and interaction time, as exemplified in Volume 4 of the ASM Handbook, Steel Heat Treatment Fundamentals and Processes, "Introduction to Surface Hardening of Steels". The product of power density of the heat source at the component surface and the interaction time of the heat source with a unit area of the workpiece is described as energy density.

According to an aspect, the application of energy used to heat the surface of the component may be applied continuously, intermittently, or a combination thereof. This may include pulsing the high energy density heat source between high and low power values.

According to an aspect, when the method of surface hardening described above is applied to a material, improved fatigue life, wear-resistance, corrosion-resistance, decreased friction coefficient or a combination thereof may result without compromising the performance of the overall component.

High energy density heat sources may be generated in any manner, so long as the energy supplied to the surface is sufficient to heat the desired volume of material sufficiently to attain the peak temperature and cooling rate necessary to result in hardening of the targeted case depth. Examples may include: electromagnetic, photon (laser), and electron-beam.

Control of the high energy density heat source may be partially automated, fully automated, mechanized, manual, or combinations thereof.

More than one high energy density heat source may be used to provide the required energy density to the surface, provided that the localized cooling rates are still sufficiently rapid.

A gas jet may be used in the area exposed to the high energy density heat source.

Cooling may be accelerated further using a gaseous jet, or any other form of quenching media.

Surface pre-treatment using coatings may be performed to enhance the absorptivity of the material being treated using high energy density heat source processing. Surface pre-treatment coatings may vary in composition and form. Examples of coatings may include black paint and/or surface oxidation.

Post-process tempering of the component may be employed if required for the specific application of the engineered component.

Repetition of the hybrid process, regardless of process combinations, may be performed to further improve the case depth, and/or average case hardness and/or peak surface hardness of an engineered component.

Increased surface hardness, increased average case hardness, and/or increased case depth of hardened cases, to an appropriate limit for the application, may improve component performance. Examples of improvements may include: longer fatigue life, increased wear-resistance, lower friction coefficient, higher resistance to mechanical damage, and improved longevity of a treated component.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A combination method for surface hardening metallic materials using surface diffusion methods and/or additive manufacturing along with transformation-based processing using a high energy density heat source will now be described with reference to FIG. 1-14. The definition of case depth may depend on base material type and/or combination of processing conditions. For clarity and consistency, in the examples described herein, the term case depth is defined as the depth below the surface where the hardness expressed in the Vickers scale drops below 440 $HV_{0.2}$. Other suitable definitions may also be used to characterize the case depth, depending on the circumstances and as known in the art.

Figure 1:
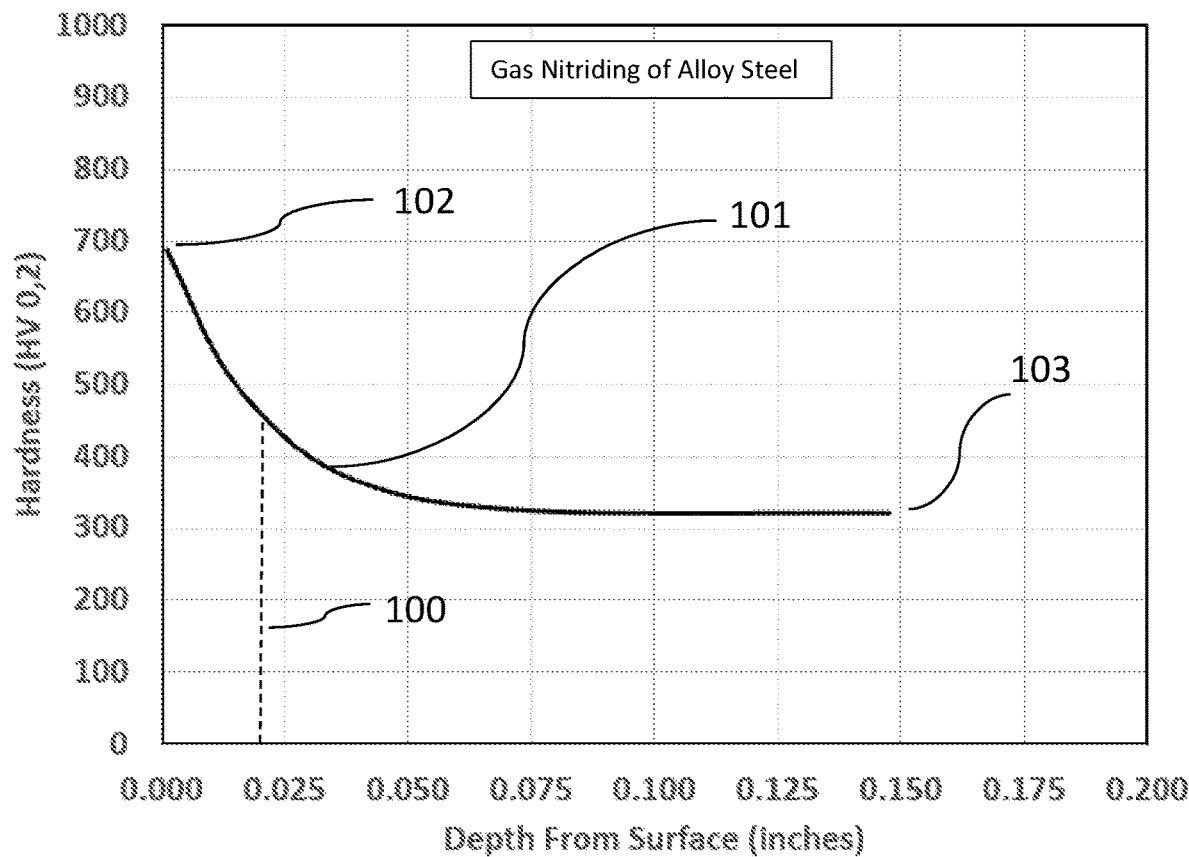
FIG. 1 depicts a graph of the hardness of a tool treated by a diffusion-based surface treatment, such as gas nitriding of alloy steel, as a function of the perpendicular distance from the surface of a component.

Referring to FIG. 1, diffusion-based processing generally results in a relatively shallow case depth 100 as shown by the characteristic hardness profile for a diffusion-based process 101. Surface hardness 102 decreases rapidly with depth from the surface as expected from the physical laws governing diffusion-based processes. The core hardness 103 is unaffected by the diffusion-based process, as designed by the time, temperature and material combination.

Figure 2:
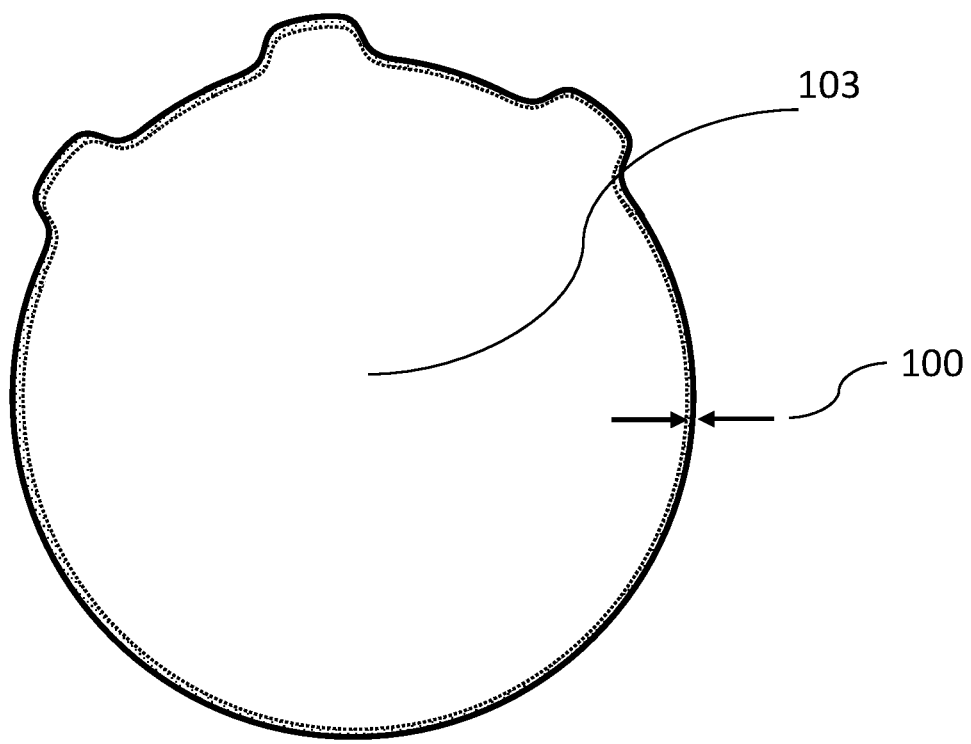
FIG. 2 depicts an end elevation view in section of a tool treated according to a prior art diffusion-based surface treatment, such as gas nitriding of alloy steel.

Referring to FIG. 2, diffusion-based processes are typically used to provide a uniform, relatively thin case hardening effect that covers all surfaces exposed to the process during treatment to a depth 100 determined by processing variables. The base material hardness 103 remains unaffected as designed by the process and material combination.

Figure 3:
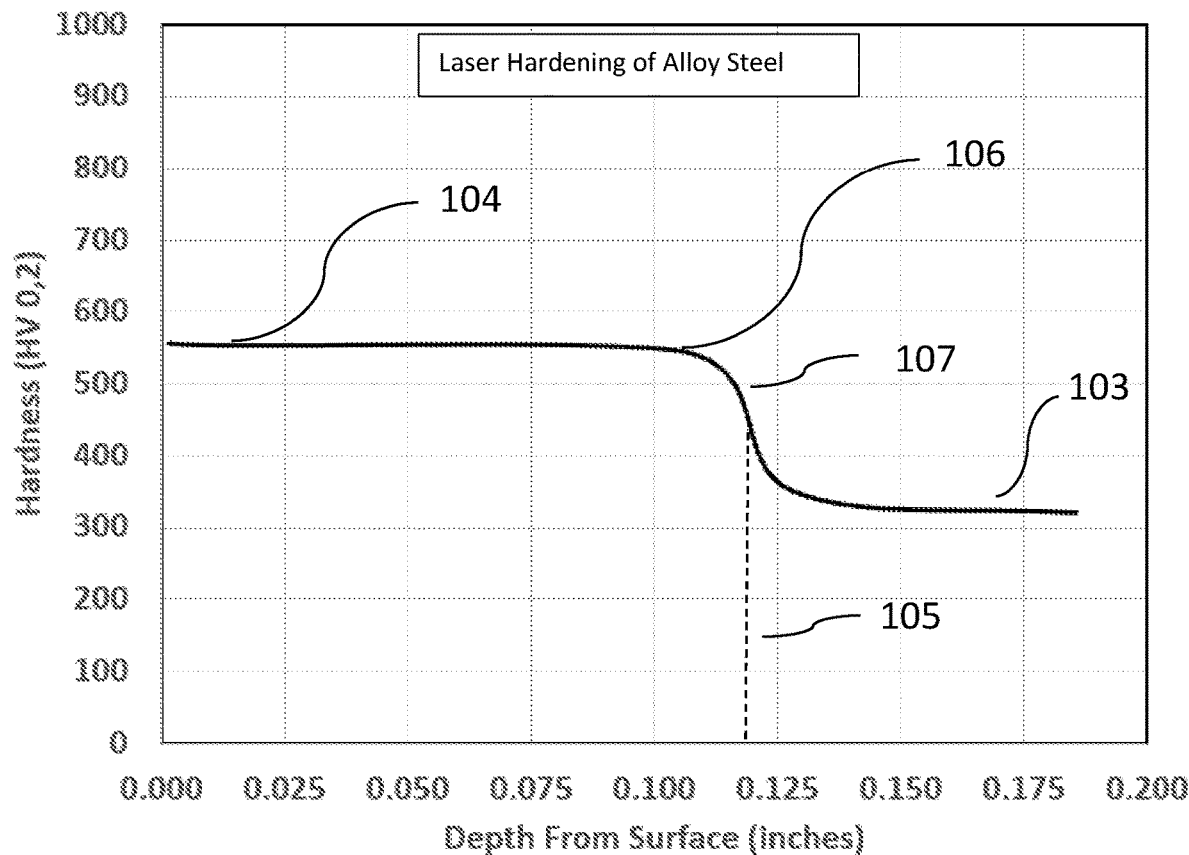
FIG. 3 depicts a graph of the hardness of the surface of a tool as a function of the perpendicular distance from the surface of the component.

Referring to FIG. 3, surface transformation-based processing generally results in a characteristically uniform surface hardness 104 for relatively deep case depths 105 as demonstrated by an example of the hardness profile for a high energy density transformation-based process 106 as a function of depth from the surface. Laser hardening of alloy steel is an example of high energy density surface transformation-based processing that results in a distinct transition from the hardened case to the unaffected base material 107. The case depth of a high energy density transformation-based process 105 may be manipulated through process parameter adjustments by those skilled in the art. The bulk material 103 is unaffected by the process.

Figure 4:
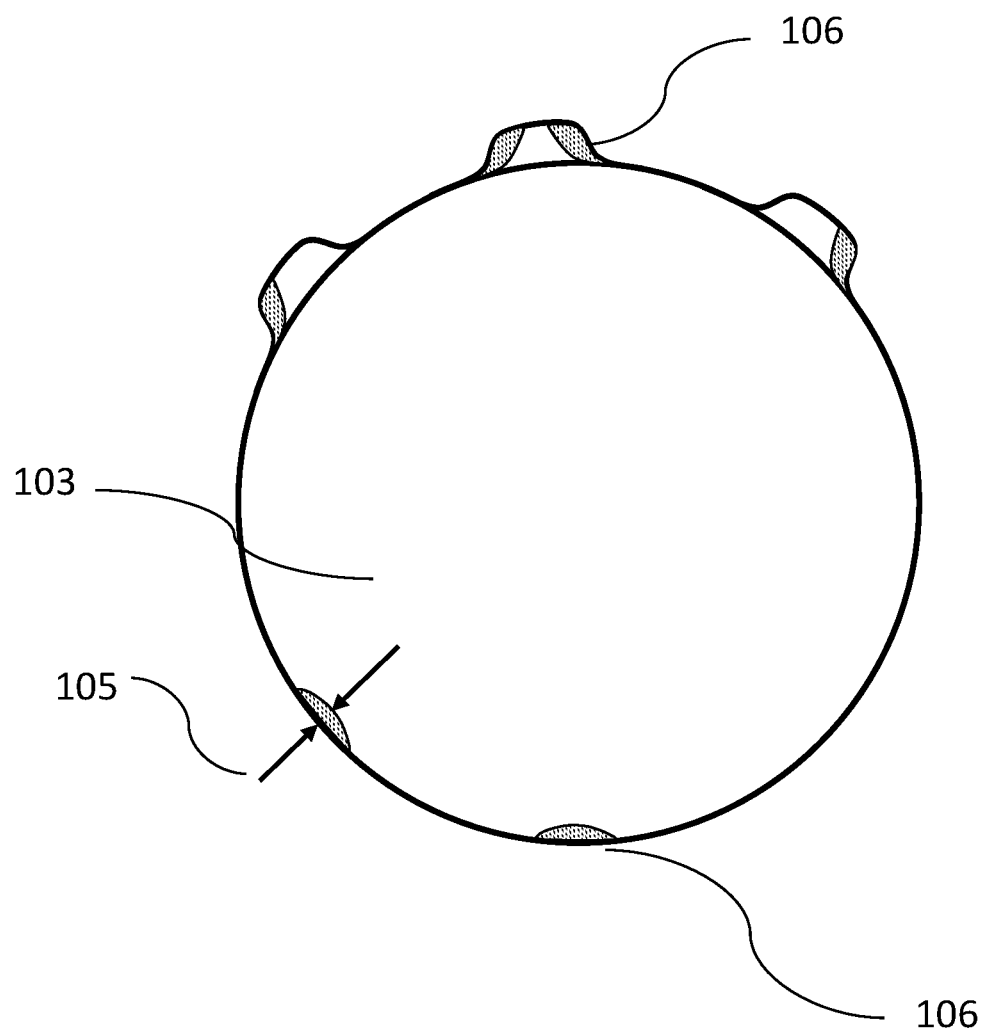
FIG. 4 depicts an end elevation view in section of a tool treated using a surface-based surface treatment according to the prior art with sufficient power density to target specific features, such as laser heat treatment of alloy steel.

Referring to FIG. 4, surface transformation-based processing with high energy density heat sources 106 may be used to target specific locations, complex features, specific locations of complex features or a combination thereof to a specific case depth 105, without affecting the properties of the base material 103 in areas that are not subjected to the treatment. Surface transformation-based hardening processes alone are not capable of changing the overall surface chemistry to enhance the surface hardening process.

Figure 5:
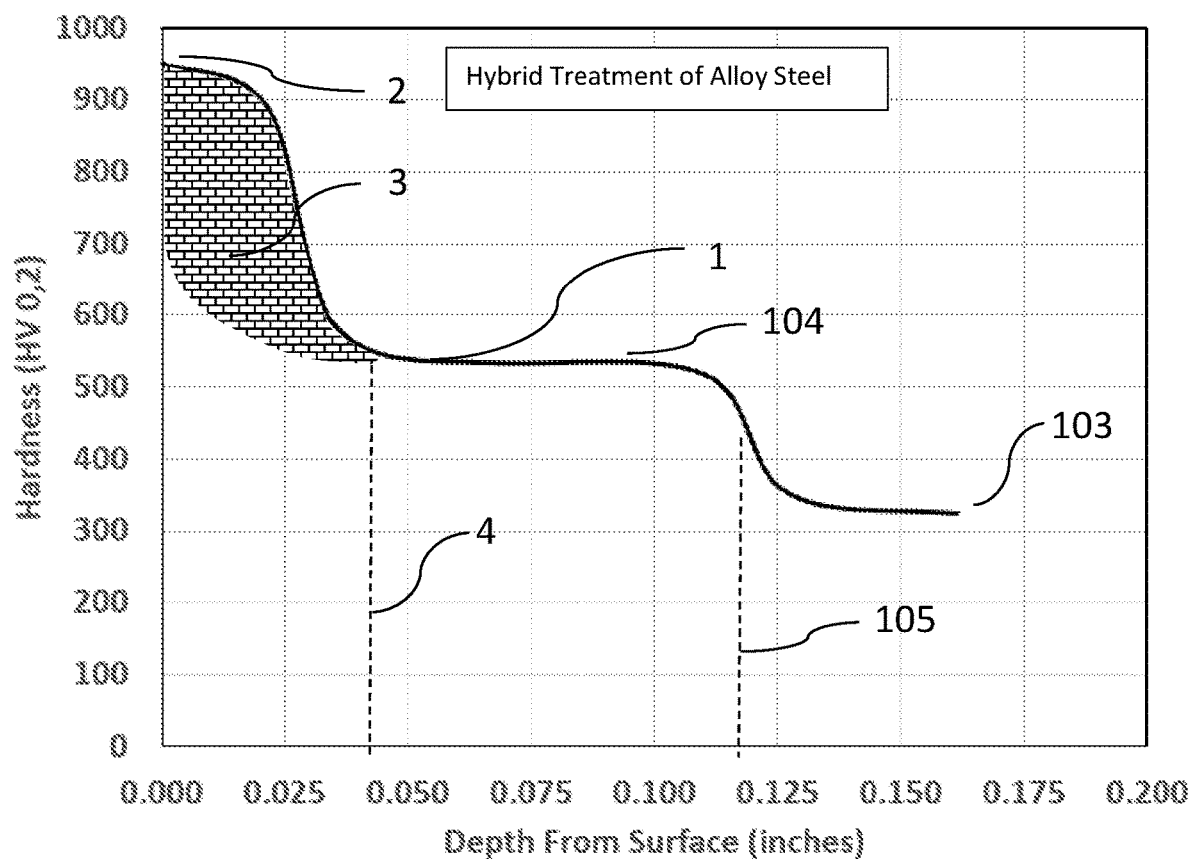
FIG. 5 depicts a graph of the hardness of a tool as a function of the perpendicular distance from the surface of the component, where the tool is treated by a combination of a diffusion-based surface treatment, such as gas nitriding of alloy steel, and a transformation-based surface treatment utilizing a high energy density heat source, such as laser heat treatment of alloy steel.

Referring to FIG. 5, the characteristic hardness profile for a hybrid process demonstrated by curve 1 with high surface hardness 2, which remains higher than either diffusion-based processing, or high energy density transformation-based processing in the hybrid processing region 3 that spans the depth from the surface of the hybrid processing region 4. There is an end to the hybrid processing region at a depth 4 determined by processing variables, where the hardness profile becomes similar to that of known high energy density transformation-based processing. This occurs when parameters of the transformation-based process result in the case depth 105 extending beyond the chemically modified zone of diffusion-based processing and/or additive manufacturing. Hybrid processing provides for relatively deep case depth 105, with relatively high surface hardness 2 over a given volume of material 3, without affecting the properties of the core of the component 103.

Figure 6:
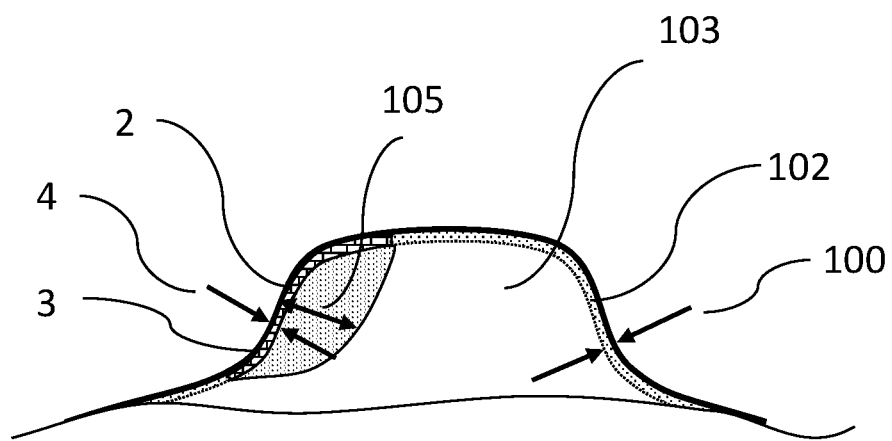
FIG. 6 depicts a detailed end elevation view in section of a tool treated by a diffusion-based surface treatment, such as gas nitriding of alloy steel, and a high energy density based transformation-based surface treatment, such as laser heat treatment of alloy steel.

In one example, referring to FIG. 6, diffusion-based processing is performed to provide sufficient diffusion of interstitial elements to a sufficient depth 100 within the component to provide relatively high hardness at surface 2 and increased hardness in the hybrid region 3 following hybrid processing. The diffusion depth 100 is dependent on the process used, required case depth, required surface hardness, required average case hardness, along with the initial chemistry and processing conditions of the material. In one example based on gas nitriding 4330V alloy steel, a nitriding potential ($k_n$) of 10 during Stage One, was held at a temperature of 500° C. for a minimum of 7 hours, followed by a second stage of a further 13 hours of gas nitriding at a nitriding potential ($k_n$) of 0.5 and a temperature of 500° C. provided an acceptable concentration profile of nitrogen near the component surface to allow for successful hybrid processing. For traditional gas nitriding, a second stage may be used to allow for further diffusion of nitrogen into the component. For the presently described hybrid processing, this second stage is used to modify the surface chemistry through diffusion to increase the melting point and phase transition temperatures at the surface so that subsequent high energy density processing may achieve deep cases 105 whilst maintaining high surface hardness 2. Specific parameters used to achieve sufficient chemical modification during gas nitriding may vary based on many factors such as component geometry, initial surface chemistry, initial microstructural state, type of diffusion-based process, Stage Two diffusion hold time duration, case depth 100 and/or case hardness requirements of the component. It is known by those skilled in the art that in the example of gas nitriding 4140 alloy steel, increased nitriding potential ($k_n$) and/or increased temperature if allowable, and/or increased time at temperature to achieve a similar interstitial concentration distribution and corresponding hardening response 101 to that observed in 4330V alloy steel. The interstitial concentration distribution resulting from diffusion-based processing is an important variable in the hybrid process. Due to the large number of variables for diffusion-based processes, it is possible for those skilled in the art to achieve similar results by different combinations of process variables. Different types of diffusion-based processing may be employed in the hybrid process for enhanced surface hardening. One example is the carburizing of 8620, which may employ a carbon potential of 1.0, held at a temperature of 925° C. for 10 hours in Stage One, followed by two hours held at a temperature of 850° C. at a reduced carbon potential of 0.8 for Stage Two to develop an appropriate interstitial concentration distribution as a function of depth from the surface for hybrid processing in accordance with the method. Due to the ability to control carbon potential, temperature and time during carburizing, a wide variety of parameters used in combination may be employed by those skilled in the art to achieve similar carburizing results.

Referring to FIG. 5, surface transformation-based processing performed with high energy density heat sources may be sufficient to provide the required heat flux at the surface of an engineered component, and may be applied in a controlled manner over the required period of time to induce microstructural transformation. Appropriate application of energy results in sufficiently rapid heating and cooling, as well as sufficiently short time at peak temperature, however long enough to austenitize the material at rapid heating rates. The peak temperature, transformation temperature, and heating and cooling rates are dictated by the energy density of the heat source and the thermal properties of the material and geometry of the component being treated. One example is the hybrid treatment of 4330V alloy steel using gas nitriding in combination with laser hardening using a fiber laser. The energy density at the component surface used to produce the characteristic hardness profile represented by curve 1 as a function of depth below the surface is 4 $kJ/cm^2$. As detailed in Volume 6A of the ASM Handbook, Welding Fundamentals and Processes, "Introduction to High Energy Density Electron and Laser Beam Welding", the energy density of the heat source required at the component surface to induce transformation may vary up to two orders of magnitude based on the absorptivity and conductivity of the metallic material being treated. Additional factors such as continuous or intermittent (pulsing from low to high values) of the high energy density heat source will also influence the required energy density for a specific application. These factors and others that influence energy density are known to those skilled in the art of high energy density transformation-based processing.

Referring to FIG. 6, hybrid processing results in a surface that has a high surface hardness 2 and a volume of material near the surface with combined effects of diffusion-based processing and high energy density processing 3, to a depth from the surface 4. If the high energy density processing parameters result in a case depth beyond the diffusion-based case depth 105, the resulting case depth of the hybrid processes will be equivalent to the high energy density processing case depth. If the high energy density case depth is shallower than the diffusion-based processing case depth, a diffusion-based processing region 100 will be observed. Due to the localized nature of hybrid treatment, any areas which were exposed to diffusion-based processing but not high energy density processing will maintain diffusion-based processing characteristics. The hybrid process does not substantially affect the core of the component 103.

Figure 7:
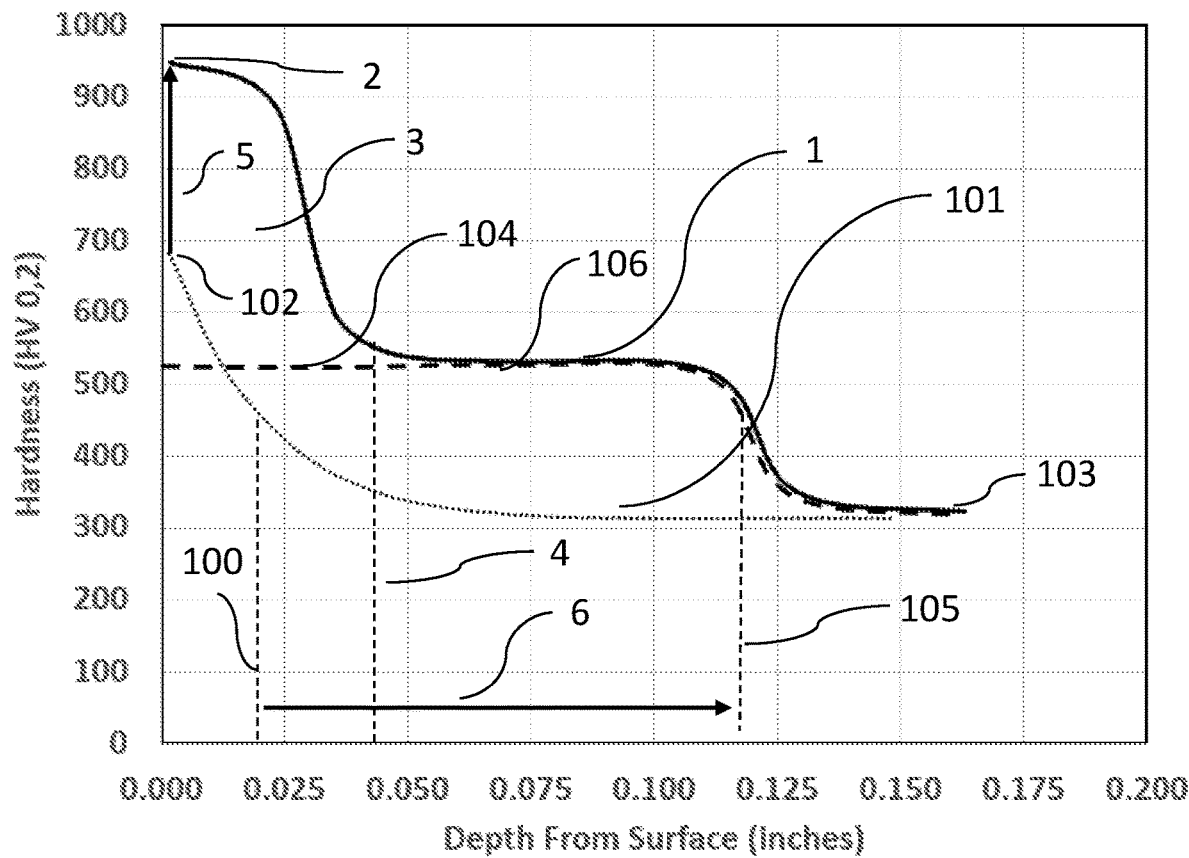
FIG. 7 depicts a graph comparing the surface hardness of a tool treated using a prior art diffusion-based process, such as gas nitriding of alloy steel, and a high energy density transformation-based process, such as laser hardening of alloy steel.

Referring to FIG. 7, surface transformation-based processing combined with diffusion-based processing, termed hybrid processing herein, results in an increase in case depth 6 when compared with the depth 100 of diffusion-based processing alone, and relatively high surface hardness 2, represented by an increase in surface hardness 5 when compared with diffusion-based processing surface hardness 102 and/or high energy density heat source processing surface hardness 104 processes individually. The use of high energy density heat sources for hybrid processing results in a transition from the surface hardness 2 to the hardness associated with surface transformation-based hardening 106 when transformation-based hardening case depth 105 is greater than the depth of the hybrid zone 4. When transformation-based hardening case depth 105 is less than the depth of the diffusion zone case depth 100, the hybrid region will transition into the diffusion-based processing hardness profile 101. The control over the depth of hardening of the hybrid zone 4 is determined by the specific material and process combinations used for hybrid processing for enhanced surface hardening.

Figure 8:
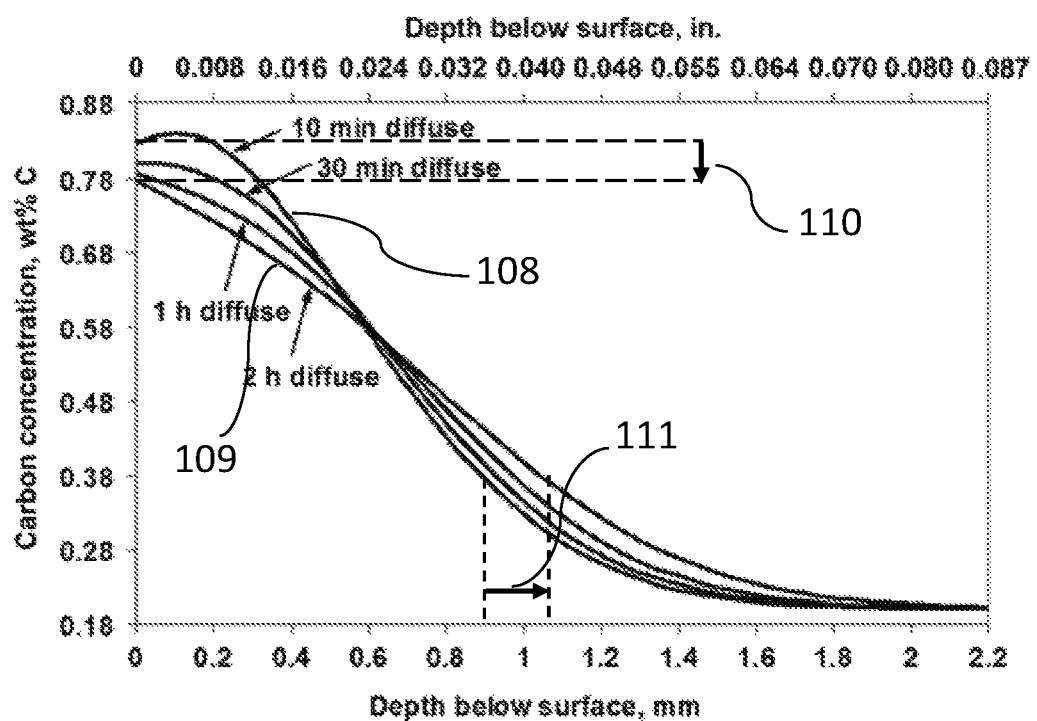
FIG. 8 depicts a graph comparing the interstitial concentration profiles in a two-stage diffusion process with different Stage Two durations.

Referring to FIG. 8, multiple stage interstitial diffusion processes are used to control the interstitial concentration distribution in the near surface region of the tool. FIG. 8, reproduced with annotations from the ASM Handbook, Volume 4A, "Gas Carburizing" is an example of multiple stage diffusion process illustrating the effect of Stage Two time on the interstitial concentration profile as a function of depth below the surface for boost-diffuse carburizing. In this example, a two-stage process wherein the flux of interstitials at the component surface in the first stage is set relatively high by manipulating process parameters in order to achieve the surface chemistry change in a shorter time. For the hybrid process described herein, the second stage serves to lower the flux of interstitials to restore the surface concentration to an acceptable range for high energy density processing whilst still allowing for diffusion into the tool. In this example, the Stage One process parameters are kept constant between curves 108 and 109, with a relatively high interstitial flux for the same duration. The Stage Two interstitial flux is also kept constant between curves 108 and 109, but the duration of Stage Two is modified. The concentration profile after 10 minutes of Stage Two 108 shows the surface interstitial concentration beginning to drop as a result of the decreased flux at the surface of the component. The concentration profile following 2 hours of Stage Two hold time, depicted by curve 109, has a lower concentration at the surface 110 and a more gradual transition to core concentration, which allows for the same concentration to a greater depth 111. The time requirement for each stage is dependent on the process being used, process specific parameters, and the desired result. For example, due to lower processing temperatures for nitriding, as well as fundamental metallurgical differences between interstitial carbon and nitrogen, Stage Two times must be significantly lengthened due to lower diffusivity rates of nitrogen interstitials in ferritic materials. Multiple stage diffusion-based processes may be used to modify the concentration at given depths. In some processes, multiple stage diffusion may be required due to the formation of a phase that decreases the adsorption and/or diffusion flux of interstitials at the component surface. Additionally, it is known by those skilled in the art that very small quantities of interstitial elements (i.e. B,C,N,O, etc.) may significantly reduce the melting point of iron and steel alloys. Therefore, it is important in this hybrid process that the near surface interstitial concentration distribution be controlled in order to prevent surface softening or melting during subsequent high energy density processing. This limit may be determined based on system specific phase diagrams, CCT curves, and other relevant metallurgical information.

When a component undergoes diffusion-based processing, the flux of interstitial atoms delivered to the surface of the component dictates the surface concentration, and concentration as a function of depth from the surface 108,109. The surface concentration is not dependent on diffusion time when a constant flux is delivered, meaning that increased time does not significantly alter the chemistry of the outer surface of the component once equilibrium is reached. Referring to FIG. 8, surface chemistry control is exemplified by Boost-Diffuse Carburization described in Section 4A of the ASM Handbook Section 4A, "Gas Carburizing". An additional example is the Floe Process described in previously held U.S. Pat. No. 2,437,249 (Floe) entitled "Method of Nitriding". In the example of gas nitriding of alloy steel, a diffusion stage using Stage One parameters (single stage processing with medium to high nitriding potential) will result in an undesirable phase change at the surface, termed the compound layer, which decreases the absorption rate of nitrogen, and has poor tribological properties despite its high hardness. The poor tribological properties of the compound layer may be unacceptable for the finished product. In order to reduce the surface concentration to reduce the thickness of the compound layer, an appropriate Stage Two duration may be used, wherein the interstitial flux is lowered and held constant for extended periods of time to reduce the interstitial content at the surface. Many processes are known that use multiple stages to tailor the surface chemistry. Use of a multiple stage diffusion process to control surface chemistry, primarily the melting point, must be used to facilitate an increased case depth with hybrid processing without surface softening or melting. Surface softening or melting may result in poor tribological properties, which may reduce the lifetime or performance of the component.

Figure 9:
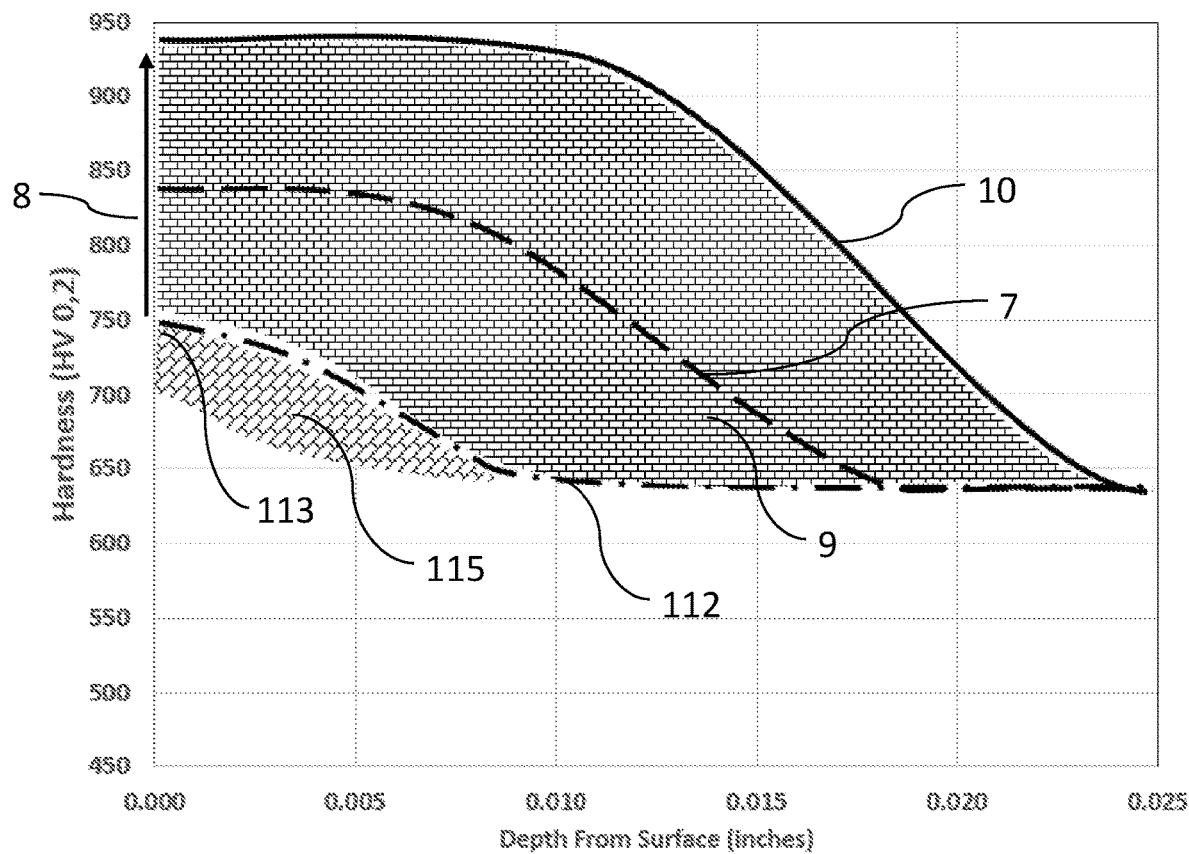
FIG. 9 depicts a graph of near-surface hardness of a tool as a function of the perpendicular distance from the surface of the component, where the tool is treated by a two-stage diffusion-based surface treatment with varying Stage Two duration, and subsequent high energy density processing in accordance with the method.

Referring to FIG. 9, the interstitial concentration distribution is a controlling factor for hybrid processing. Reduced interstitial content at the surface of a tool resulting from extended Stage Two duration typically lowers the surface hardness resulting from diffusion-based processing alone. However, holding for an extended duration in Stage Two increases hardness following the hybrid processing as shown by curve 10. Typically Stage Two treatments are designed to allow for the necessary time for diffusion, driven by the concentration gradient established during Stage One of the process. Reduced flux of interstitials in Stage Two is used to prevent excessive formation of phases with poor tribological properties when relatively deep cases are required that require corresponding long Stage Two hold times. Increasing Stage Two hold times result in a more gradual transition of interstitial concentration from the surface to the core as exemplified in FIG. 8. The reduced interstitial content at the surface of the component and corresponding metallurgical changes resulting from Stage Two diffusion typically result in decreased surface hardness following diffusion-based processing alone and the surface interstitial concentration will decrease with increasing Stage Two duration. The reduced surface concentration of interstitials associated with increased Stage Two diffusion allows for greater energy density application during subsequent high energy density processing in accordance with the method. The greater allowable energy density is due to the corresponding increase in melting point of steels with lower interstitial concentration. Increased energy density application during hybrid processing allows for increased case depth resulting from the hybrid process. For example, the hardening response of an alloy steel with the same Stage One and Stage Two gas nitriding parameters, but different Stage Two durations will yield different degrees of hardening within the hybrid region 3 with the same subsequent high energy density processing. An example of the beneficial effects of increased Stage Two duration on alloy steel during gas nitriding is presented by applying Stage One parameters for gas nitriding of 7 hours at 500° C. at a nitriding potential (Kn) of 10, and Stage Two parameters with varying diffusion times, held at 500° C. at a nitriding potential (Kn) of 0.5. Subsequent high energy density transformation-based hardening applied an energy density of 3 kJ/cm$^2$ for hybrid processing in accordance with the method. With no diffusion time allowed in Stage Two (ie: Stage One only), a relatively small hybrid hardening zone 115 is produced, with a low hardening response throughout, which is typified by the relatively low surface hardness 113. With increased Stage Two duration of 13 hours, a significant increase in the hardening response represented by curve 7, is demonstrated by the increase in surface hardness 8 and increase in hybrid hardening region 9. Further extending Stage Two diffusion duration to 60 hours results in a further improvement in the hybrid hardening response, represented by curve 10. Reduced concentration of nitrogen at the surface may yield a lower hardness following diffusion-based processing, however the case depth of the diffusion-based processing region will be increased, which extends the depth of the hybrid region 4. The lower interstitial concentration at the surface resulting from Stage Two is doubly beneficial as it allows for the surface to be exposed to more energy without surface melting during high energy density processing, which allows for deeper overall case depths. As noted herein, due to the time-temperature dependence of diffusion, increased temperature will allow for diffusion to occur over a reduced time period. Increased temperature may result in component distortion and other deleterious effects. However, increased temperature for a given process and material combination may be beneficially used in the presently described method.

Figure 10:
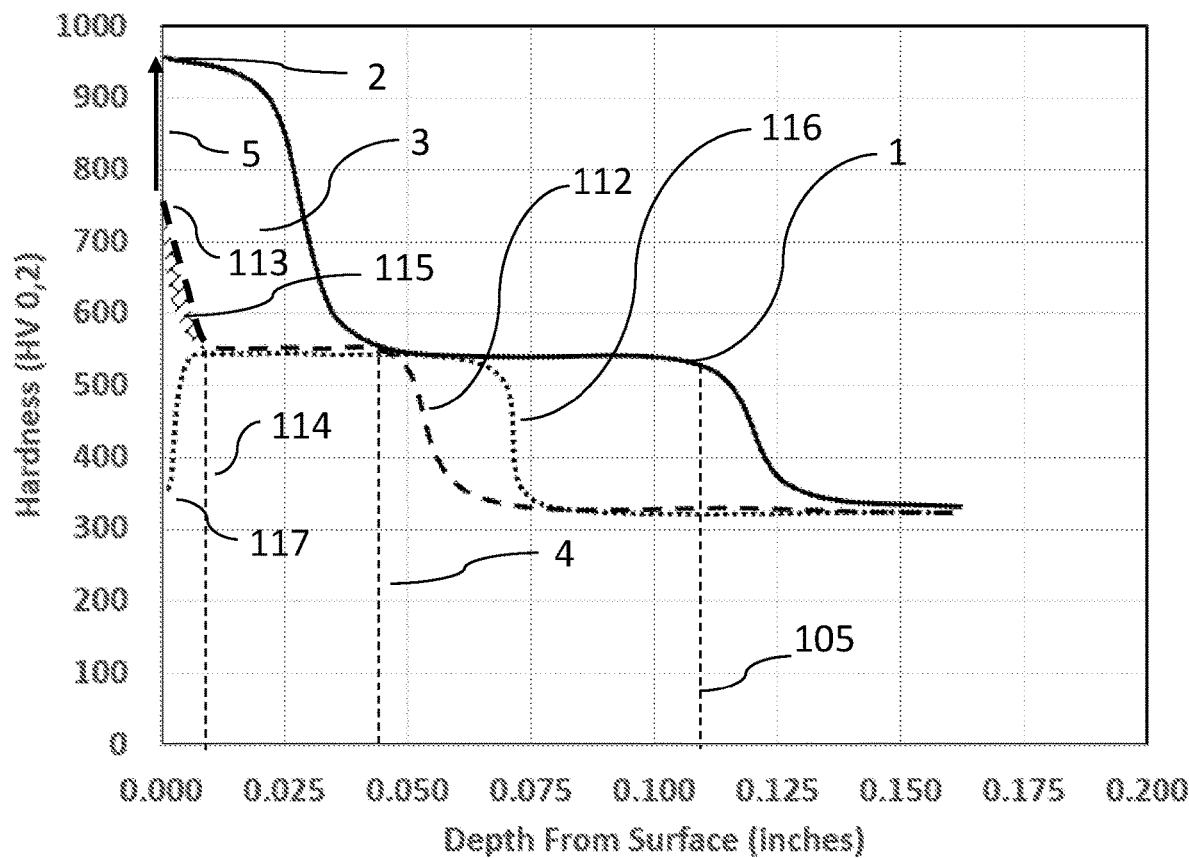
FIG. 10 depicts a comparison of hardness curves where surface nitrogen concentration is sufficiently low to enable a deeper case without causing surface softening or melting.

Referring to FIG. 10, hybrid processing with adequate control of surface interstitial content prior to high energy density transformation-based processing allows for an improved hardness profile 1, while maintaining deeper case depths 105 without surface softening or melting. As described herein, relatively short diffusion times may result in a moderate increase in surface hardness following diffusion processing 113, however short diffusion times may reduce the melting point of the steel at the surface of a tool, which limits the energy flux during transformation-based processing and therefore the ability to produce deep cases without surface softening or melting 117. In the case of nitriding alloy steel, surface melting during hybrid processing is a result of a decreased melting point due to the increased concentration of nitrogen at the component surface. It is possible to maintain surface hardness with an inadequately controlled chemistry 113, but the case depth is limited to avoid surface melting 112 through modification of high energy density processing parameters. If an inadequately controlled surface chemistry is subjected to high energy density treatment intended to result in a deeper case 116, surface softening or melting 117 will result. In the example of hybrid processing using gas nitriding of 4330V alloy steel followed by laser hardening, the diffusion of interstitials and metallurgical changes resulting from the second stage at low interstitial potential is key to providing the beneficial hardening effects obtained by processing in accordance with the method. Insufficient diffusion of interstitials may result in a hardening response of the near surface similar to that of diffusion-based processing alone after hybrid processing, or only a moderate improvement in surface hardness 113, over a relatively shallow depth of hybrid region 114, and a relatively small volume of hardened material 115. The case depth determined by the high energy density transformation-based processing portion of hybrid processing, curve 116 may be limited compared with the capability demonstrated when sufficient diffusion of interstitials 109 was employed. The consequence of surface melting resulting from insufficient control of surface chemistry 108 results in complete elimination of the beneficial surface hardening effects of hybrid processing in the near surface region 117. The control of surface chemistry allows for increased case depth 105 without surface softening or melting, allowing for high surface hardness 2.

Figure 11:
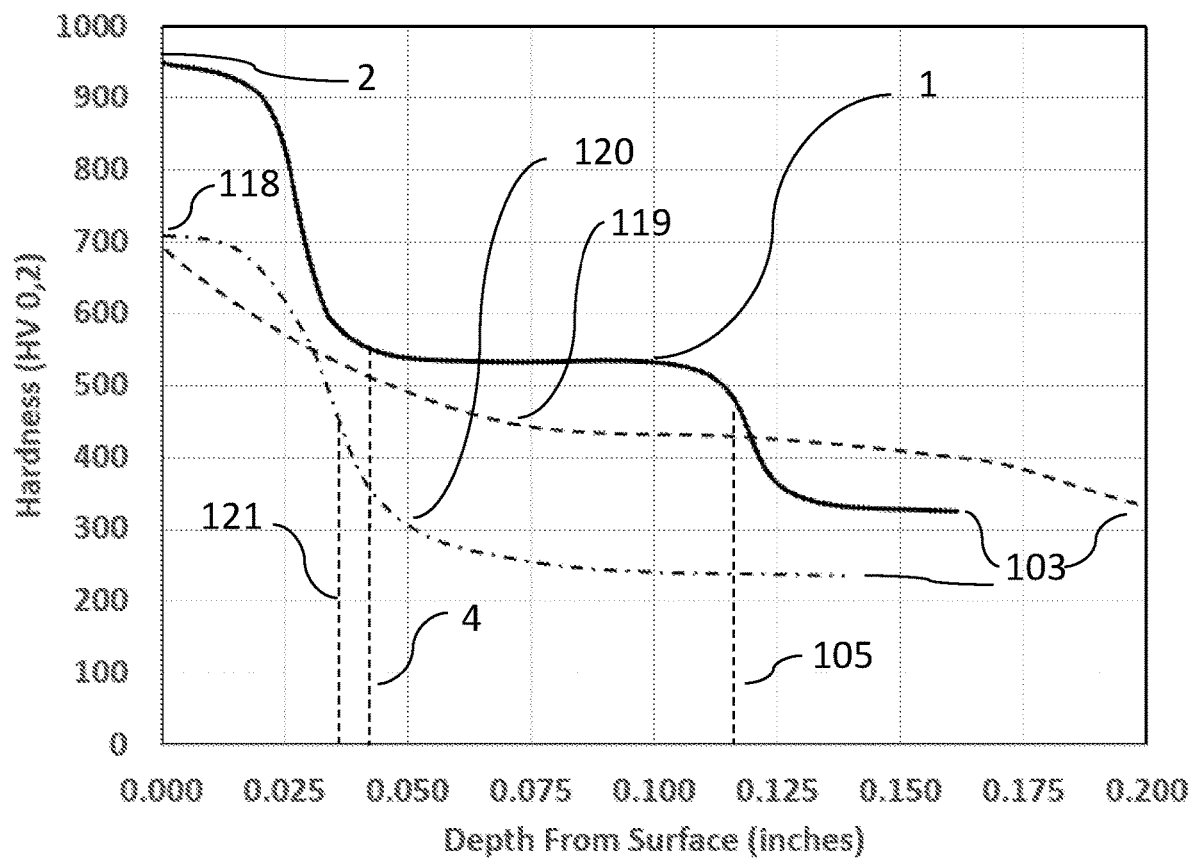
FIG. 11 depicts a comparison of hardness curves where the energy density of the heat source used for surface transformation-based processing is insufficient to be considered high energy density.

Referring to FIG. 11, the high energy density heat source is controlled to provide sufficiently rapid heating to reach the targeted peak temperature without significant conduction of heat beyond the targeted area to ensure that the resultant cooling rate is sufficiently fast so as to create the beneficial hardening of the hybrid process. The use of surface transformation-based processing with insufficient energy to be considered high density results in increased time at high temperature, which results in lower surface hardness 118 when compared to curve 1. In addition, the use of insufficient energy density surface transformation processing does not exhibit distinct transitions in hardness 119 that are associated with high energy density surface transformation-based processing when high heat input is applied to drive the case deep into the material. It is possible to produce distinct transitions in hardness using induction hardening by reducing the total heat input of the process 120. The consequence of reduction of heat input is that the case depth obtained as a result 121 is severely limited. The use of surface oxide coatings as known in the art to prevent diffusion of interstitials out of the surface during surface transformation-based processing with insufficient energy density (induction hardening) 120 may be used to increase the average case hardness when compared with induction hardening at higher heat input and without oxide surface coatings, however surface hardness 118 and case depth 121 remain significantly lower than the that of curve 1 and are only moderately increased when compared to diffusion-based processing alone.

Figure 12:
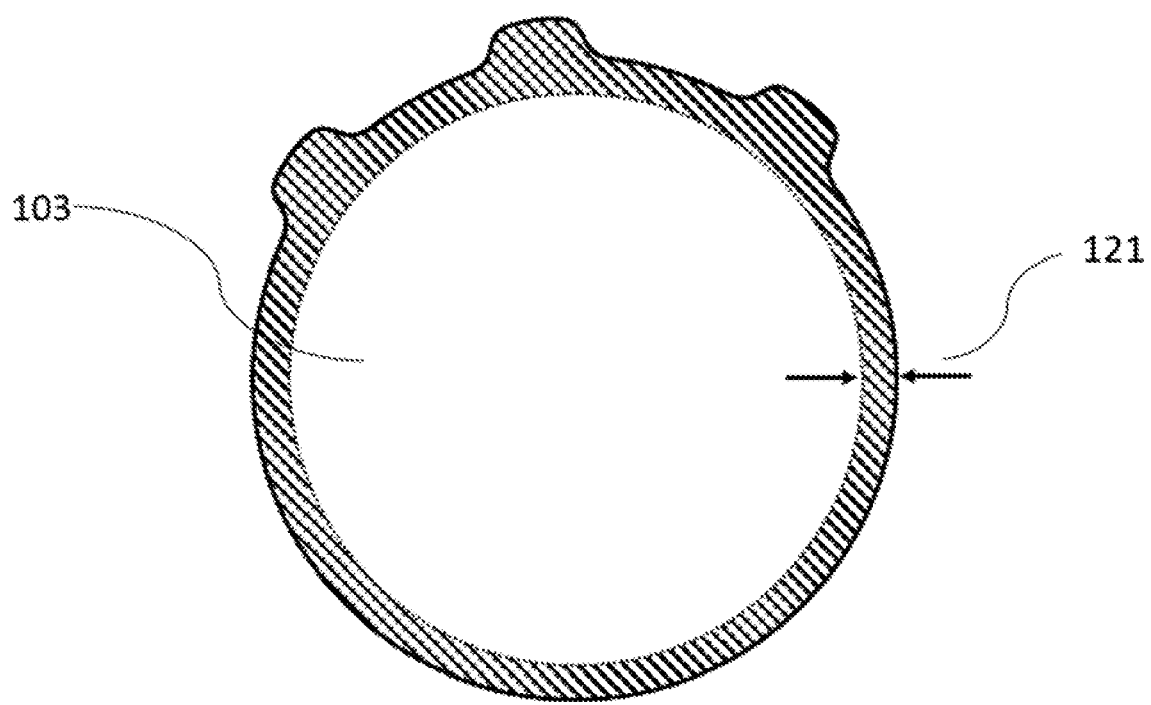
FIG. 12 depicts an end elevation view in section of a tool subjected to a surface-based surface treatment with insufficient power density to target specific features, such as induction hardening of alloy steel.

Referring to FIG. 12, surface transformation-based processing with insufficient energy density to be considered high energy density does not have the capability to target complex features, specific locations of complex features or a combination thereof to the same extent as high energy density transformation-based processing. The requirement of external cooling resulting from the fundamental nature of processing with reduced energy density, for example an induction heat source, is considered to be inferior to the primary heat transfer mode of internal cooling resulting from the fundamental nature of high energy density heat sources with respect to the current invention. Internal cooling resulting from high energy density heat source processing is considered to be superior as it results in more rapid cooling rates and reduced time at elevated temperatures. Induction heat sources also lack localized control of treated areas to mitigate the risk of defects associated with conduction of heat beyond the target region and the resultant slower cooling rates and need for external cooling. The lack of localized control prevents the targeting of specific features. The inherent self-cooling ability associated with high energy density heat source processing allows for faster cooling rates, as the material cools predominantly by conduction through the core owing to the steep temperature gradient associated with high energy density processing. Sufficiently rapid cooling rates also result in abrupt changes in hardness as a function of depth from the surface, which are a result of distinct changes in microstructure associated with heating and cooling rates associated with high energy density surface transformation-based processing. Rapid cooling is also important to prevent the formation of undesirable microstructural constituents and allows for development of high surface hardness of the hybrid process 2 and provides for distinct transitions from the hardened region to the unaffected base material while retaining the capability to achieve relatively deep case depths associated with surface transformation-based processing 1. High energy density transformation-based hybrid processes also allow for deep case depth 105 while maintaining high surface hardness 2 when compared to surface hardness 118 and case depth 121 of low power density transformation-based processes 119,120. Reduced cooling rates tend to result in gradual transitions in hardness 119 when high heat input is applied, which may be representative of slack quenching. Slack quenching is defined by ASM as incomplete hardening due to cooling at a rate slower than the critical cooling rate for a given steel. It is known that slack quenching and the corresponding undesirable microstructural constituents may have a significant negative impact on the properties of metallic components as exemplified by the Journal of Research of the National Bureau of Standards research paper 2799 entitled "Impact Properties of Slack-Quenched Alloy Steels", Vol 59, No. 4, October 1957.

The energy density of the heat source is used to provide sufficient energy to facilitate microstructural changes in the material, whilst low enough to ensure that melting does not occur if the effects of melting are inappropriate for the function of the finished component. Some melting may be tolerable for the overall component assuming a sufficient hold time during diffusion-based processing, with a limit that melting may not extend beyond the region of chemical modification due to the softening effect related to melting and that the softening effect does not reduce the hardness below that of either diffusion based processing or high energy density processing alone. One example of such surface melting was observed at energy density of 6 kJ/cm$^2$ for 4330V alloy steel using a fiber laser. It may be noted that the allowable energy density may be dependent on various factors, some examples of which include: absorptivity of the incident surface, material chemistry, presence of oxide layer, surface finish, type of energy source, part geometry, and material thickness. As a result, energy density will vary when any one, or a combination of these variables are changed as exemplified herein with reference to the Volume 6A of the ASM Handbook, Welding Fundamentals and Processes, "Introduction to High Energy Density Electron and Laser Beam Welding". The change in energy density requirements for the above-mentioned factors is known by those skilled in the art of high energy density transformation-based processing.

The high energy density heat source may not depend on a particular intensity profile. Some examples may include: point heat sources, Gaussian-heat sources, "top hat" heat sources. High energy density heat sources are well defined in the prior art in terms of power density and interaction time, as exemplified in Volume 4A of the ASM Handbook, Steel Heat Treatment Fundamentals and Processes, "Introduction to Surface Hardening of Steels".

The application of energy used to heat the surface of the component may be applied continuously, intermittently, or a combination thereof. In one example, the high energy density heat source may be pulsed between high and low power values.

The high energy density heat source may be generated in any manner, so long as the energy supplied to the surface is sufficient to heat the desired volume of material sufficiently to affect the peak temperature and cooling rate as necessary to result in the targeted case depth and surface hardness. Some examples include: electromagnetic, photon (laser), and electron-beam.

The path of the high energy density heat source may be controlled using manual, mechanized, partially-automated, fully-automated methods, or combinations thereof.

Any number of high energy density heat sources may be used to provide the required energy density to the surface, provided that cooling rates are sufficient to achieve the desired hardening.

Shielding gas or vacuum may be used during the high energy density heat source process to prevent excessive oxidation of the surface, or to limit diffusion to the atmosphere as is known in the art. Some examples include: Argon, Nitrogen, and Helium.

A gas jet may be used to control uniformity and maintain low temperatures in the area exposed to the high energy density heat source as detailed in the prior art.

Cooling may be accelerated further using a gaseous jet, or any other form of quenching media as detailed in the prior art.

Surface pre-treatment using coatings may be performed to enhance the absorptivity of the material being treated using high energy density heat source processing or for any other purpose as is known in the art. Surface pre-treatment coatings may vary in composition and form. Examples of suitable coatings may include black paint and/or surface oxidation.

Additive manufacturing may be used in combination with diffusion-based processes to elicit surface chemistry changes, or to enhance the diffusion-based process by modifying the surface chemistry to improve the driving force for precipitate growth and/or interatomic diffusion and/or to increase the melting point at the surface to allow for deeper case depths associated with high energy density processing in accordance with the method.

Figure 13:
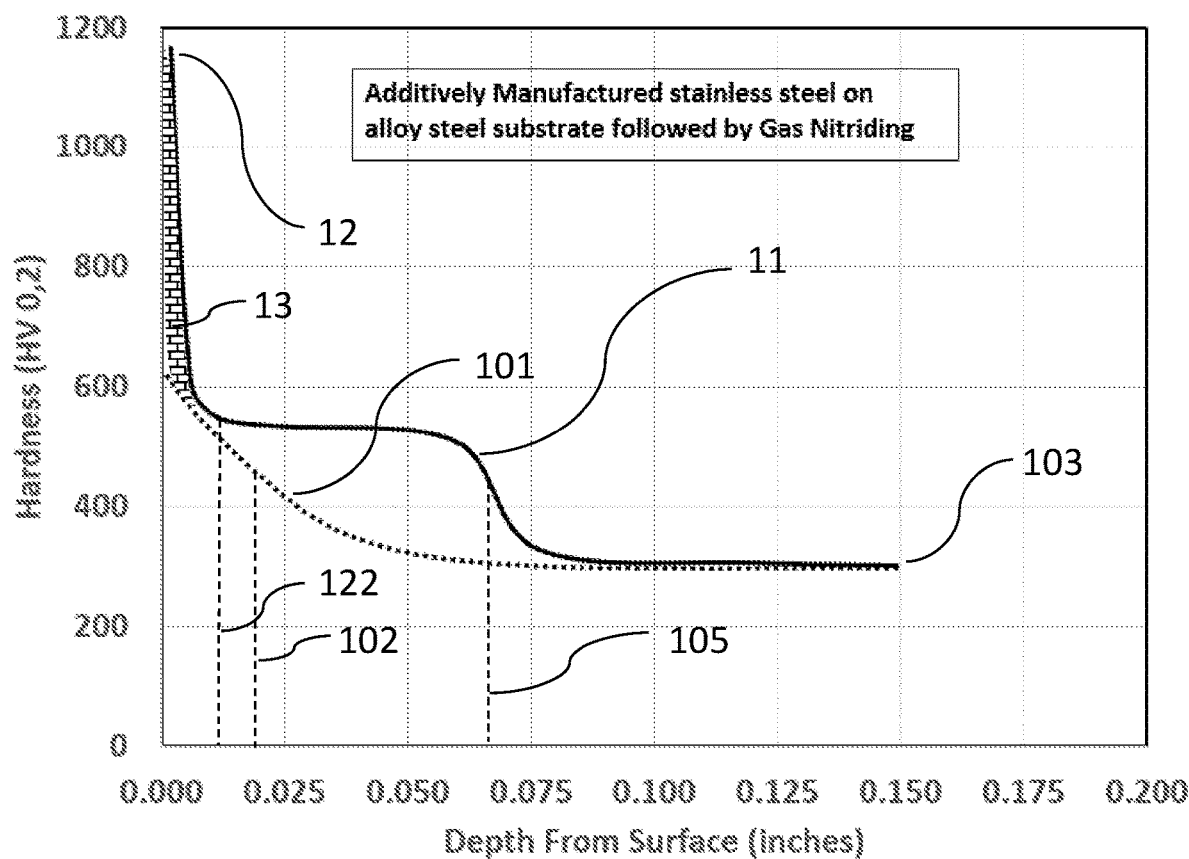
FIG. 13 depicts a comparison of hardness curves of hybrid processing using an additively manufactured surface chemistry modification to elicit an increase in hardness when performed in combination with a diffusion-based surface treatment, such as gas nitriding, and high energy density surface transformation based processing showing hardness as a function of distance from the surface of the component.

Referring to FIG. 13, modification of the local surface chemistry through additive manufacturing 122 may be used to elicit a specific change hardness as a function of depth from the surface of the component, curve 11. Hybrid processing using additive manufacturing 122 for chemical modification in combination with diffusion-based processing may result in very high surface hardness 12 over a volume of material 13. The chemical modification that is obtained through the combination of additive manufacturing and diffusion-based processing may result in surface hardness 12 that is higher than that achievable through hybrid processing with diffusion-based chemical modification alone 2. This is demonstrated by the example of additively manufactured stainless steel deposited on an alloy steel substrate followed by gas nitriding. High energy density transformation-based surface hardening may be combined with additive manufacturing and/or diffusion-based processing to enhance the response of diffusion-based processing further and increase the effective case depth to that associated with surface transformation-based processing 105.

Referring to FIG. 13, the hardness as a function of depth from the surface described by curve 11, with surface hardness 12 over a volume of material 13. Referring to FIG. 13, this may be applied to an engineered component by using additive manufacturing 122 to change the chemical composition locally in order to provide a response to hybrid processing that is different from the remainder of the component 101, which is the original chemical composition modified by diffusion-based processing alone. One example of chemical modification using additive manufacturing 122 is a 410 grade stainless steel fused to a 4330V alloy steel substrate using a laser deposition process with a diode laser. The energy density required for successful fusion is 2.3 kJ/cm$^2$, which represents the product of power density of 8.3 kW/cm$^2$ and interaction time of 0.3 s with a mass transfer rate of stainless steel powder introduced to the molten pool of 0.6 g/s. Subsequent high energy density transformation-based processing in accordance with the method facilitates the characteristically deep case depth 105 associated with the hybrid process 11, while maintaining very high surface hardness 12. It is well known by those skilled in the art that chemical composition of the base material may dramatically affect the response of diffusion-based and/or surface transformation-based processing as detailed in Volume 4 of the ASM Handbook for a variety of processes. It is important to consider the effects of surface chemistry on the melting point of the material to allow for the target case depth to be achieved without surface melting during high energy density processing.

Figure 14:
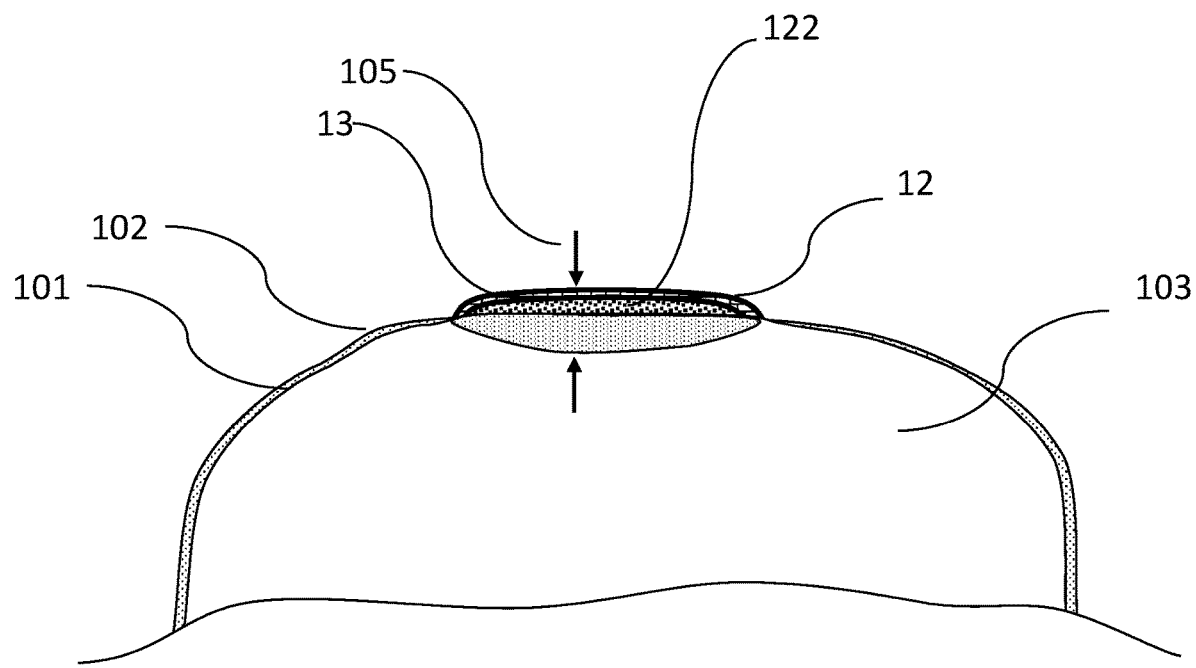
FIG. 14 depicts a detailed side elevation view in section of a tool subjected to hybrid processing using additive manufacturing to modify the surface chemistry or create a feature, which may have dissimilar metallic alloys combined with a diffusion-based surface treatment and high energy density surface transformation-based processing.

Referring to FIG. 14, additive manufacturing may be enhanced by diffusion-based processing to create the chemically modified layer required for hybrid processing. An additively manufactured feature 122 may be deposited on a component to alter surface chemistry locally, while diffusion-based processing may alter all exposed surfaces simultaneously 101. Subsequent diffusion-based processing on top of an additively manufactured surface may be used to cause chemical modification in the entirety of the exposed surface 101 to result in enhanced surface hardness 102, but may also augment the locally modified chemistry 13 to enhance surface hardness even further 12 following hybrid processing.

Post-process tempering of the component may be done if required for the specific application of the engineered component as detailed in the prior art. Intermediate heat treatment may also be necessary to maintain core properties when chemical modification is comprised of multiple processing steps.

Increased surface hardness and/or depth of hardened cases may improve components. Examples of improvements include: longer fatigue life, increased wear-resistance, lower friction coefficient, higher resistance to mechanical damage, improved longevity of component as detailed in Volume 18 of the ASM Handbook.

Repetition of the hybrid process regardless of process combinations may be performed to further improve the case depth, and/or average case hardness and/or peak surface hardness of an engineered component.

In this patent document, the term "melting" refers to the melting and re-solidification in the surface region of the finished part. Melting may be considered to be acceptable so long as the melted region is subjected to post-process material removal or heat treatment. The compound effect of combining diffusion-based processing and high energy density heat sources is not diminished in the entire treatment cross-section, but only in the section exposed to melting. As a result, the modification of energy density by manipulation of process parameters and/or material properties described herein to induce surface melting is not considered to be outside the scope of this invention. Additionally, if acceptable for the function of a given tool, surface softening and/or melting may be acceptable provided the surface hardness remains higher after hybrid processing when compared with diffusion-based processing alone.

The terms "combination", "combined" and similar variations of these terms are intended to be interpreted according to the mathematical definition for combination, which is that a combination is a collection of objects where the order is not defined. Correspondingly, the mathematical term used when order is implied, or is considered important would be a permutation of those same objects.

The empirical values set forth above are included as examples, and are not intended to be limiting.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of hardening a surface of a metallic component, the method comprising the steps of:
   subjecting the metallic component to a diffusion-based process that comprises:
     in a first stage, causing interstitial elements to diffuse below the surface of the metallic component at a first interstitial flux by heating the metallic component and exposing the surface of the metallic component to a diffusing agent; and
     in a second stage, continuing to heat the metallic component to cause interstitial elements to diffuse below the surface of the metallic component at a second interstitial flux that is less than the first interstitial flux; and
   subsequent to the diffusion-based process, subjecting at least a portion of the metallic component to a transformative hardening process by heating successive sections of the surface of the metallic component using a focused source of energy to induce a temperature gradient that causes microstructural changes in each of the successive sections that are heated;
   the diffusion-based process and transformative hardening process being performed such that a surface hardness of the metallic component is improved more than a surface hardness resulting from each process separately.

2. The method of claim 1, wherein the surface hardness comprises a deeper case depth or a harder surface at the at least a portion of the surface of the metallic component relative to a nominal surface hardness of the metallic component.

3. The method of claim 1, wherein the surface hardness comprises a harder surface at the at least a portion of the surface of the metallic component relative to a nominal surface hardness of the metallic component.

4. The method of claim 1, wherein, in the first stage, the first interstitial flux is based on interstitial elements being introduced into the metallic component, and interstitial elements moving within the metallic component.

5. The method of claim 1, wherein, in the second stage, the second interstitial flux is based substantially on movement of interstitial elements within the metallic component.

6. The method of claim 1, wherein the second stage continues at least until a concentration of interstitial elements immediately adjacent to the surface begins to decrease.

7. The method of claim 1, wherein the interstitial elements comprise one or more elements selected from a group consisting of boron, carbon, nitrogen, oxygen, or combinations thereof, and the diffusing agent comprises one or more compounds of the one or more elements.

8. The method of claim 1, wherein the diffusion-based process further comprises one or more additional stages in which the metallic component is heated to cause interstitial elements to diffuse at additional interstitial fluxes.

9. The method of claim 1, wherein a duration of each of the first stage and the second stage are selected to control the resultant interstitial distribution as a function of depth from the surface of the metallic component.

10. The method of claim 1, further comprising the step of depositing material on at least a portion of the metallic component in an additive manufacturing process prior to the diffusion-based process.

11. The method of claim 9, wherein the source of energy is applied continuously, intermittently, or at varying power levels.

12. The method of claim 1, wherein the at least a portion of the metallic component comprises a first hardness for a first depth below the surface of the metallic component, a second hardness for a second depth below the first depth, and a nominal material hardness below the second depth, the first hardness being greater than the second hardness, and the second hardness being greater than the nominal material hardness.

13. The method of claim 12, wherein the second depth is less than $\frac{1}{8}$ inch below the surface of the metallic component.

* * * * *